(12) United States Patent
Bernard et al.

(10) Patent No.: US 8,126,226 B2
(45) Date of Patent: Feb. 28, 2012

(54) SYSTEM AND METHOD TO GENERATE A SELECTED VISUALIZATION OF A RADIOLOGICAL IMAGE OF AN IMAGED SUBJECT

(75) Inventors: Sylvain Bernard, Montigny le Bretonne (FR); Serge Muller, Guyancourt (FR); Bruno Le Corgne, Essone (FR)

(73) Assignee: General Electric Company, Schenectady, NY (US)

( * ) Notice: Subject to any disclaimer, the term of this patent is extended or adjusted under 35 U.S.C. 154(b) by 1163 days.

(21) Appl. No.: 11/858,694

(22) Filed: Sep. 20, 2007

(65) Prior Publication Data
US 2009/0080765 A1    Mar. 26, 2009

(51) Int. Cl.
*G06K 9/00* (2006.01)
(52) U.S. Cl. ......... 382/128; 382/131; 382/132; 382/294
(58) Field of Classification Search .................. 382/128, 382/131, 132, 294
See application file for complete search history.

(56) References Cited

U.S. PATENT DOCUMENTS

| | | | |
|---|---|---|---|
| 5,970,111 A * | 10/1999 | Samarasekera et al. .......... | 378/4 |
| 6,351,573 B1 * | 2/2002 | Schneider ..................... | 382/294 |
| 7,054,409 B2 * | 5/2006 | Ross et al. ..................... | 378/19 |
| 7,187,790 B2 * | 3/2007 | Sabol et al. .................... | 382/128 |
| 7,194,117 B2 * | 3/2007 | Kaufman et al. .............. | 382/128 |
| 7,269,244 B2 * | 9/2007 | Tang et al. ..................... | 378/19 |
| 7,310,435 B2 * | 12/2007 | Mallya et al. .................. | 382/128 |
| 7,379,572 B2 * | 5/2008 | Yoshida et al. ............... | 382/128 |
| 7,444,011 B2 * | 10/2008 | Pan et al. ....................... | 382/131 |
| 7,477,720 B2 * | 1/2009 | Pack et al. ......................... | 378/4 |
| 7,492,934 B2 * | 2/2009 | Mundy et al. ................. | 382/128 |
| 7,583,777 B2 * | 9/2009 | Tang et al. ......................... | 378/4 |
| 2002/0075994 A1 * | 6/2002 | Shahidi et al. .................. | 378/62 |
| 2003/0007598 A1 * | 1/2003 | Wang et al. ..................... | 378/37 |
| 2003/0149364 A1 * | 8/2003 | Kapur et al. ................... | 600/439 |
| 2003/0223627 A1 * | 12/2003 | Yoshida et al. ............... | 382/128 |
| 2004/0120557 A1 * | 6/2004 | Sabol et al. .................... | 382/128 |
| 2004/0125917 A1 * | 7/2004 | Ross et al. ..................... | 378/98.8 |
| 2005/0089205 A1 * | 4/2005 | Kapur et al. ................... | 382/128 |
| 2005/0152588 A1 * | 7/2005 | Yoshida et al. ............... | 382/128 |
| 2006/0182327 A1 * | 8/2006 | Mundy et al. ................. | 382/132 |
| 2007/0036418 A1 * | 2/2007 | Pan et al. ....................... | 382/131 |
| 2009/0147073 A1 * | 6/2009 | Getty .............................. | 348/51 |

OTHER PUBLICATIONS

U.S. Appl. No. 11/756,471 entitled "Method for the Processing of Radiological Images in Tomosynthesis for a Detection of Radiological Signs" by Bernard et al., filed May 31, 2007.
U.S. Appl. No. 11/757,924 entitled "Method for the Processing of Radiological Images for a Detection of Radiological Signs" by Bernard et al., filed Jun. 4, 2007.

(Continued)

*Primary Examiner* — David A Vanore

(57) ABSTRACT

A system to illustrate image data of an imaged subjected is provided. The system comprises an imaging system, an input device, an output device, and a controller in communication with the imaging system, the input device, and the output device. The controller includes a processor to perform program instructions representative of the steps of generating a three-dimensional reconstructed volume from the plurality of two-dimensional, radiography images, navigating through the three-dimensional reconstructed volume, the navigating step including receiving an instruction from an input device that identifies a location of a portion of the three-dimensional reconstructed volume, calculating and generating a two-dimensional display of the portion of the three-dimensional reconstructed volume identified in the navigation step, and reporting the additional view or at least one parameter to calculate and generate the additional view.

18 Claims, 5 Drawing Sheets

OTHER PUBLICATIONS

U.S. Appl. No. 11/828,451 entitled "Method for the Processing of Radiology Images for a Detection of Opacities" by Bernard et al., filed Jul. 26, 2007.

U.S. Appl. No. 11/220,496 entitled "System and Method for 3D CAD Using Projection Images" by Wheeler et al., filed Sep. 7, 2005.

U.S. Appl. No. 11/545,305 entitled "Method and Apparatus for Tomosynthesis Projection Imaging for Detection of Radiological Signs" by Peters et al., filed Oct. 10, 2006.

U.S. Appl. No. 11/673,616 entitled "X-Ray Device and Image Processing Method" by Muller et al., filed Feb. 12, 2007.

* cited by examiner

SYSTEM AND METHOD TO GENERATE A SELECTED VISUALIZATION OF A RADIOLOGICAL IMAGE OF AN IMAGED SUBJECT

BACKGROUND OF THE INVENTION

The subject matter generally relates to the field of radiology imaging and, more particularly, to a system and method to create a visualization that enables faster analysis of radiology image data. Although the subject matter is described with respect to medical imaging, and in particular mammography, the subject matter can also be applied to industrial imaging of miscellaneous subject matter (e.g., security screening, etc.).

Radiology imaging generally employs translation of a measured attenuation of transmitted x-rays through an imaged subject into image data of the anatomical structure of the imaged subject for illustration on a display.

A certain known type of radiological imaging system is employed in mammography to acquire radiological images of breast tissue. Generally, multiple different views of the breast tissue are desired in diagnostic mammography. Each of the multiple different views generally corresponds to a different position of the X-ray source and the image receiver in relation to the breast tissue.

Mammography is widely used today in the detection of radiological signs associated with lesions and the prevention of breast cancer. These signs may be either calcium deposits or cases of opacity. Calcium deposits are called microcalcifications and individually form small-sized elements (ranging from 100 μm to 1 mm in diameter) that are more opaque to X-rays than the surrounding tissues. Opacities are dense regions where the X-rays are absorbed more intensely than in the adjacent regions.

A typical mammography image generally includes projections of superimposed structures that interfere with a desired visibility of the breast tissue. These projections of the superimposed structures increase opportunities of a false positive interpretation if a structure resembles a lesion, or a false negative interpretation if the structure obscures the visibility of the lesion.

A typical resolution of a mammography image detector is about 100 μm. To address the limitations of projected views in mammography images, image data is acquired from several projections and at different angles of a volume of interest. This image data is then applied to a tomography reconstruction algorithm to create a digital, three-dimensional reconstruction of the volume of interest. As a result of the above, screening or interpretation of this digital, three-dimensional reconstruction of the volume of interest typically involves screening or reviewing of a large amount of image data in a sequential manner on a slice-by-slice (e.g., 50 to 80 tomography slices of image data) in the search for a small piece of information of clinical interest, such as a radiological sign of between 100 μm and 1 mm in size.

BRIEF DESCRIPTION OF THE INVENTION

Accordingly, there is a need for an imaging system and method that enhances efficiency and reduces the time to screen through a large amount of image data of a three-dimensional, tomographic image reconstruction of a volume of interest in the search for radiological signs of clinical interest. There is also a need for a system and method reduces a probability of a false interpretation in the search for radiological signs of clinical interest.

The embodiments of the subject matter described herein address the needs described above. In particular, the subject matter described herein provides a system and method of imaging that improves visualization and reduces a time to screen through acquired image data in the search for radiological signs of clinical interest.

In accordance with one embodiment, a method to illustrate image data of an imaged subject as acquired by a radiological imaging system is provided. The method includes the steps of acquiring a plurality of two-dimensional, radiography images of an imaged subject; generating a three-dimensional reconstructed volume from the plurality of two-dimensional, radiography images; navigating through the three-dimensional reconstructed volume, the navigating step including receiving an instruction from an input device that identifies a location of a portion of clinical interest within the three-dimensional reconstructed volume; calculating and generating additional view of the volume portion of the three-dimensional reconstructed volume identified in the navigation step; and reporting the at least one additional view or at least one parameter to calculate and generate the additional view.

In accordance with another embodiment, a system to illustrate image data of an imaged subjected is provided. The system comprises an imaging system operable to acquire a plurality of two-dimensional, radiography images of the imaged subject, an input device, an output device, and a controller in communication with the imaging system, the input device, and the output device. The controller includes a memory with a plurality of program instructions for execution by a processor, the plurality of program instructions representative of the steps comprising generating a three-dimensional reconstructed volume from the plurality of two-dimensional, radiography images, navigating through the three-dimensional reconstructed volume, the navigating step including receiving an instruction from an input device that identifies a location of a volume portion of the three-dimensional reconstructed volume, calculating and generating an additional view of the volume portion of the three-dimensional reconstructed volume identified in the navigation step, and reporting the at least one additional view or at least one parameter to calculate and generate the additional view.

Embodiments of varying scope are described herein. In addition to the aspects described in this summary, further aspects will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
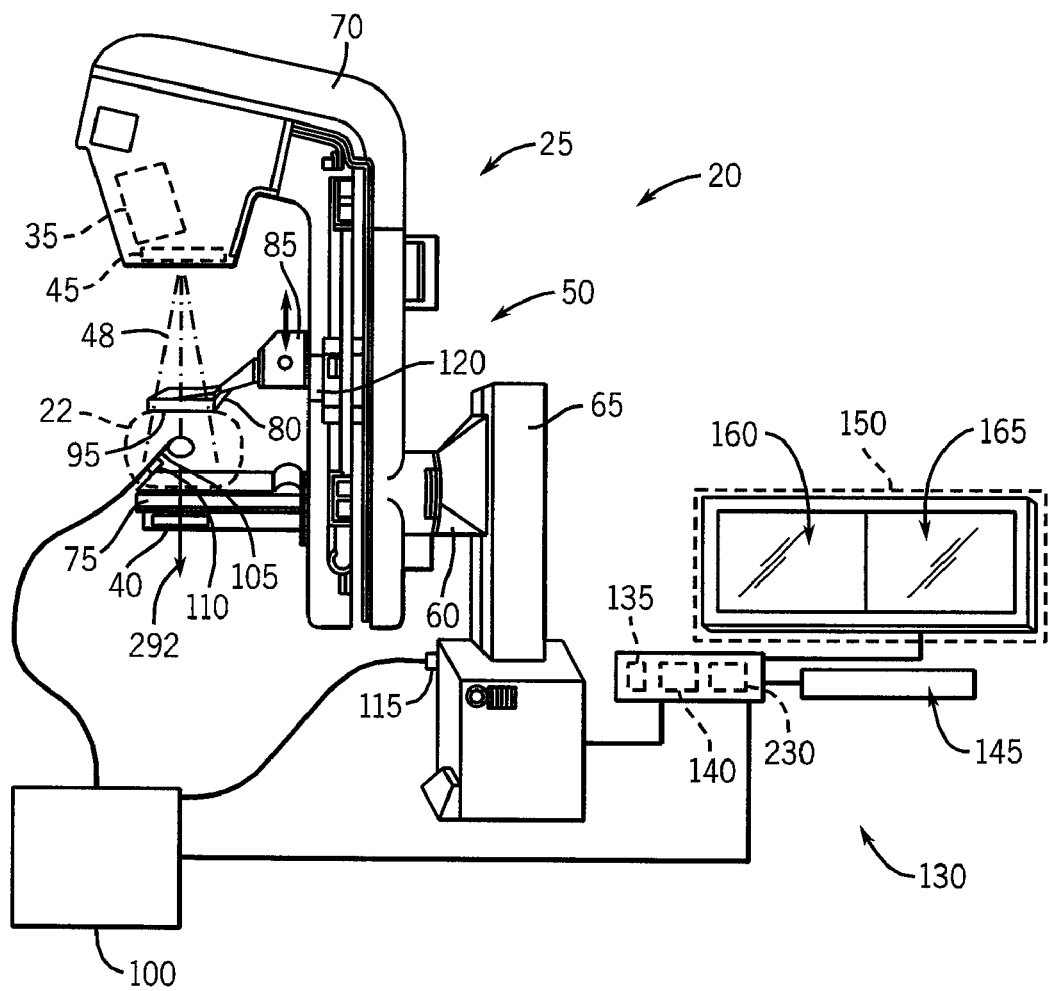
FIG. 1 is a schematic diagram of an embodiment of a system operable to automatically generate a selected visualization of an anatomical region of interest of an imaged subject.

FIG. 1 illustrates an embodiment of a system 20 operable to generate a selected visualization of a region of interest of an imaged subject 22. The system 20 generally includes an imaging system 25 operable to acquire multiple different views of anatomical images of the imaged subject 22.

The illustrated embodiment of the imaging system 25 is configured to acquire diagnostic mammography images of a breast tissue of the imaged subject 22. The imaging system 25 is generally operable to generate a two-dimensional, three-dimensional, or four-dimensional image data corresponding to an area of interest of the imaged subject 110. Although the illustrated type of the imaging system 25 is mammography, the type of imaging system 25 can vary. For example, the type of imaging system 25 can include, but is not limited to, computed tomography (CT), magnetic resonance imaging (MRI), X-ray, positron emission tomography (PET), ultrasound, angiographic, fluoroscopic, and the like or combination thereof. The imaging system 25 can be of the type operable to generate static images acquired by imaging systems (e.g., CT systems, MRI systems, etc.) prior to a medical procedure, or of the type operable to acquire real-time images with real-time imaging systems (e.g., angioplastic systems, etc.) during the medical procedure. Thus, the types of images generated by the imaging system 25 can be diagnostic or interventional.

The illustrated embodiment of the imaging system 25 generally includes an energy source 35 (e.g., x-ray emitting tube) in communication with an image receptor 40 in a known manner so as to generate radiological images of the imaged subject 22 located therebetween. A focus 45 is operable to emit an energy beam 48 (e.g., x-ray beam) generated by the energy source 35. Examples of the image receptor 40 include x-ray image intensifier tube, solid state detector, gaseous detector, or any type of detector which transforms incident x-ray photons either into a digital image or into another form which can be made into a digital image by further transformations. Embodiments of the image receptor 40 can be flat or curved-shaped.

The illustrated embodiment of the imaging system 25 further includes a gantry 50 constructed in mobile support of the energy source 35 and image receptor 40 in relation to the imaged subject 30. The illustrated gantry 50 includes a vertical column 65 coupled to a mobile arm 70. The mobile arm 70 can be generally C-shaped or U-shaped or other shape (e.g., L-shaped, circular, etc.). The image receptor 40 is coupled to the mobile arm 70 and positioned opposite the energy source 35 in the direction of emission so as to receive energy beam 48. The mobile arm 70 is operable to move the energy source 35 and/or the image receptor 40 between a vertical, horizontal, or various oblique orientations. An embodiment of the mobile arm 70 is pivotally coupled to the vertical column 65 so as to shift or move the source 35, yet leaving the receptor 45 immobile. Another embodiment of the mobile arm 70 is operable to simultaneously move the energy source 35 and the image receptor 40 in relation to the imaged subject 22.

The illustrated embodiment of the mobile arm 70 is coupled to a breast-holder tray 75 configured to receive the region of interest (e.g., the breast) of the imaged subject 22. This breast-holder tray 75 is located on top of or above the image receptor 40. The embodiment of the imaging system 25 further includes a compression paddle 80 coupled to a hinged arm 85. The compression paddle 80 is configured to either be manually or motor-driven (e.g., a carriage) so as to slide in a direction between the energy source 35 and the image receptor 40, thereby compressing the breast tissue of the imaged subject 22 against the breast-holder tray 75. The compression paddle 80 is comprised of a material (e.g., plastic, polycarbonate, etc.) so as to be generally transparent to the energy beam 48. The compression force applied by the compression paddle 80 in relation to the breast-holder tray 75 is operable to generally immobilize the breast tissue and to enhance the image quality of the acquired images of the breast tissue by the imaging system 25.

Examples of the imaging system 25 include the SENOGRAPHE® DS system as manufactured by GENERAL ELECTRIC®, the PLANMED NUANCE® system as manufactured by PLANMED, the GIOTTO IMAGE® system as manufactured by IMS®, the SELENIA® system as manufactured by HOLOGIC®, the SECTRA MICRODOSE MAMMOGRAPHY™ system as manufactured by SECTRA® and the MAMMOMAT NOVATION DR® system as manufactured by SIEMENS®.

In order to enable the study of each part of the breast of the imaged subject 22, the beam 48 may be oriented in a multitude of directions about the breast tissue of the imaged subject 22. Upon receiving the attenuated energy beam 48 having passed through the imaged subject 22, the receptor 40 translates the detected attenuation of energy into an image of the anatomical structure of interest.

For mammography screening, generally a cranio-caudal and an oblique medio-lateral projection of image acquisition is typically performed on each breast. After having received the multitude of beams 48 which cross a part of the anatomical area of interest, the image receptor 40 generally emits electrical signals corresponding to the intensity of the detected attenuated energy. These electrical signals may then be translated to generate a projection image (e.g., X-ray image) corresponding to the anatomical area of interest. The imaging system 25 may also include software operable to generate a three-dimensional, reconstructed model or image of the anatomical area of interest from a series of acquired projection images generated from the multitude of directions of the energy beam through the imaged subject 22.

The system 20 further includes a navigation system 100 operable to track movement and/or locate a tool 105 traveling through the imaged subject 22. An embodiment of the tool 105 includes surgical tool, navigational tool, a guidewire, a catheter, an endoscopic tool, a laparoscopic tool, ultrasound probe, pointer, aspirator, coil, or the like employed in a medical procedure. Yet, the type of tool 105 can vary.

An embodiment of the navigation system 100 is generally operable to track or detect a position of the tool 105 relative to the at least one acquired projection image or three-dimensional reconstructed model generated by the imaging system 115. An embodiment of the navigation system 100 includes an array or series of tracking elements 110 and 115 connected (e.g., via a hard-wired or wireless connection) to communicate position data (See FIG. 1). Yet, it should be understood that the number of tracking elements 110 and 115 can vary. An embodiment of the tracking elements 110 and 115 comprises at least one transmitters or dynamic references in electromagnetic communication or electromagnetically coupled with one or more receivers. At least one of the tracking elements 110 transmits a field of electromagnetic energy (e.g., 10-20 kHz) operable to be detected by at least one other tracking elements 115. In response to passing through a field of electromagnetic energy, the receiver 115 generates a signal indicative of a special relation to the transmitter 110. Yet, it should be understood that the type of mode of coupling, link or communication (e.g., rf, infrared light, etc.) operable to measure a spatial relation or orientation can vary.

In accordance with one embodiment, one of the tracking elements 110 or 115 is attached at the tool 105 being tracked traveling through the imaged subject 22. The other of the tracking elements 110 and 115 is attached at a reference (e.g., the imaged subject 22, the gantry 50, etc.). The navigation system 125 is operable to track movement of the object 105 in accordance to known mathematical algorithms programmed as program instructions of a software. Examples of known navigation software to track movement include INSTATRAK® as manufactured by the GENERAL ELECTRIC® Corporation, the STEALTHSTATION® as manufactured by MEDTRONIC® Corporation, and KOLIBRI® as manufactured by BRAINLAB® Corporation. The exemplary software is also operable to use two- or three-dimensional MRI, CT and/or X-ray acquired image data generated by the imaging system 25 to build a digitized three-, or four-dimensional anatomical roadmap or model of a patient's anatomy, and electromagnetic (EM) tracking technology that operates as a type of global-type positioning system to show a real-time spatial relation or location of the tool 105, as illustrated with a representation 120 (a cursor, triangle, square, crosshairs, etc.), relative to the anatomical roadmap.

The system 20 also includes a controller 130 connected in communication with the imaging system 25 and the navigation system 100. The controller 130 generally includes a processor 135 in communication in a conventional manner with a memory 140. The memory 140 generally includes a data memory and a program memory 140 configured to store computer readable program instructions to be executed by the processor 135.

The controller 130 is also connected in communication with an input device 145 and an output device 150. Examples of the input device 145 include a keyboard, a touch-screen, mouse device, toggle switches, joystick, etc. or combination thereof. Examples of the output device 150 include a monitor, an audible speaker, light-emitting diodes (LEDs), etc. or combination thereof. An embodiment of the output device 150 includes a screen or monitor (e.g., liquid crystal monitor) operable to display multiple viewports or panes or windows (e.g. as generated using MICROSOFT Windows®) 160 and 165. Of course, the output device 150 can include additional monitors or screens and is not limiting on the subject matter described herein.

Figure 2:
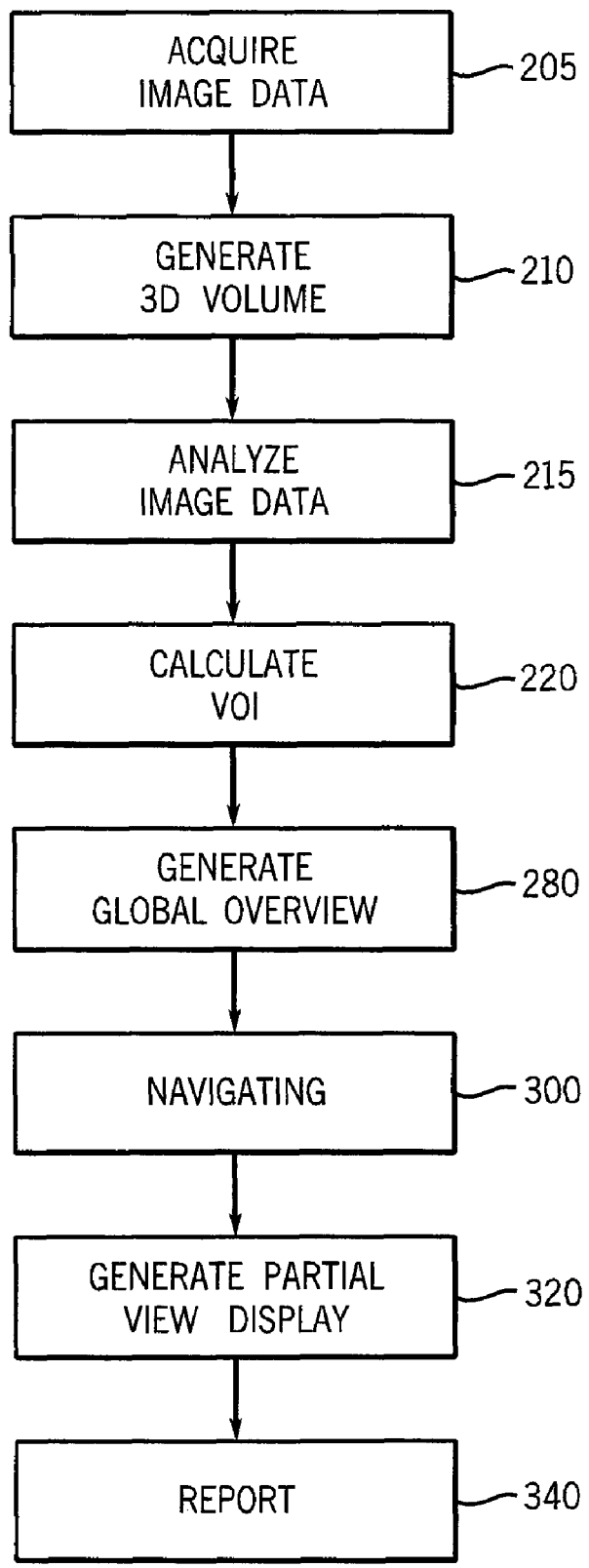
FIG. 2 illustrates a flow diagram of an embodiment of a method to automatically generate a selected visualization of an anatomical region of interest of an imaged subject using the system illustrated in FIG. 1.

Having described a general construction of one embodiment of the system 20, FIG. 2 illustrates a general description of an embodiment of a method 200 of operating the system 20 to generate a selected visualization of a region of interest of an imaged subject 22, making it possible to dynamically reveal an image element (e.g., pixels, voxels) that includes data indicative of a radiology sign of a suspected lesion. It should also be understood that the sequence of the acts or steps of the method 200 as discussed in the foregoing description can vary. Also, it should be understood that the method 200 may not require each act or step in the foregoing description, or may include additional acts or steps not disclosed herein. An embodiment of the acts or steps of the method 200 can be in the form of a computer-readable program instruction for storage in the memory 140 and execution by the processor 135 or a computer in general.

Step 205 includes acquiring a plurality of projected images (P1 through Pn) at a plurality of directions or angles (D1 through Dn) of the anatomical area of interest (e.g., the breast tissue) of the imaged subject 22.

Step 210 includes generating a digital, three-dimensional, reconstructed model or volume 212 of the imaged anatomy. An embodiment of the three-dimensional, reconstructed volume 212 is created by applying a back-projection reconstruction algorithm to the acquired image data or any other 3D reconstruction algorithm, generating a series of slice planes 214, 216, 218 of image data in succession relative to one another. A term used to refer herein to this technique is tomosynthesis. All or a portion of the acquired image data or frames (e.g., two-dimensional radiological image frames) can be used during this tomosynthesis reconstruction to generate the digital, three-dimensional reconstructed volume 212 of the imaged anatomy (e.g., breast tissue).

Step 220 includes detecting or identifying one or more radiological signs or voxels of an opacity to be suspect or candidates of a lesion in the imaged anatomy. An embodiment of step 220 includes applying an opacity or radiology sign detection algorithm to calculate the particular elements (e.g., pixels, voxels, etc.) of the three-dimensional, reconstructed volume likely to include image data of an opacity or radiology sign correlated to a candidate lesion. According to one embodiment, the radiological sign detection algorithm is applied to the pixels that constitute the two-dimensional image frames acquired by the imaging system 25. According to another embodiment, the opacity detection algorithm is applied to the voxels that constitute the slice planes 214, 216, 218 of the digital, three-dimensional reconstructed volume 212 generated by the imaging system 25.

For example, an embodiment of step 220 includes calculating an intensity level (e.g., contrast, grayscale, etc.) of each image element (e.g., pixel or voxel) of each slice 214, 216, 218 of the generated three-dimensional volume 212. The terms of "contrast" or "grey" or "grayscale" levels of the opacity or radiological sign of a suspect lesion refer to a parameter value of the image elements corresponding to more strongly absorbed or greater attenuation of energy (e.g., radiation) relative to image elements of other imaged anatomical structures. Step 220 further includes comparing the calculated values of the intensity of each image element relative to predetermined conditions or threshold values indicative of opacities or radiological signs of the suspect lesion. For those image elements (e.g., pixels, voxels, etc.) within the predetermined threshold or range of the opacity or radiological sign (e.g., microcalcification), step 220 includes assigning those image elements with a designation and graphical representation indicative of candidacy to be the suspect lesion that is viewable at the output device 150 to the user.

Step 225 includes calculating a bounding surface or marker 226 to delineate and highlight the one or more elements of radiology sign or opacity to be the suspect lesion, as described in step 220. This embodiment of the bounding surface 226 can generally demarcate a maximum spatial extent, herein referred to as a volume of interest (VOI) 228, of the image elements (e.g., pixels, voxels) identified to include radiological sign or opacities of the suspect lesion in the three-dimensional, reconstructed volume 212.

One embodiment of step 225 includes calculating the bounding surface 226 of the VOI 228 to be located at the extreme positions of the elements (e.g., pixels, voxels, etc.) of radiological sign or opacity of a suspect lesion. Accordingly, for each image element of the radiology sign of the suspect lesion, this embodiment of step 225 includes calculating a position of each of each of the image elements (e.g., pixels or voxels) along the axes X, Y and Z that defines the spatial relation and orientation of the VOI 228 or three-dimensional, reconstructed volume 212. For each axis X, Y or Z, this embodiment of step 225 includes calculating those image elements having a minimum position and a maximum position (e.g., Xmin, Xmax, Ymin, Ymax and Zmin, Zmax) relative to the axes X, Y and Z. The locations of those elements are identified to demarcate an extent of the bounding surface 226 of VOI 228 of the three-dimensional, reconstructed volume 212 identified to include the suspect lesion.

A second embodiment of step 225 includes calculating or generating a mathematical model that defines a shape (e.g., ellipsoid, cylinder, sphere, etc. or combination thereof) of the bounding surface 226 that defines the VOI 228 identified in the three-dimensional, reconstructed volume 212 identified to include the suspect lesion. This embodiment of step 225 includes applying an algorithm to calculate a distribution of the image elements (e.g., pixels, voxels) identified to include a radiology sign or opacity of the suspect lesion, and then correlating the distribution of the image elements to a parametric shape and size as defined by the mathematical model to be the bounding surface 226 of the VOI 228 that at least envelopes the suspect lesion. The shape and size of the bounding surface 226 defined by the mathematical model can vary.

An embodiment of step 225 further includes comparing the bounding surface 226 to predefined constraint parameters (e.g., shape and size) of the suspect lesion, and changing the shape or size of the bounding surface 226 accordingly to satisfy the predefined constraint parameters.

An embodiment of step 225 further includes identifying or calculating the succession of slices 214, 216, 218 that constitute the three-dimensional, reconstructed volume 212 as having a non-null intersection with the bounding surface 226, and re-calculating the bounding surface 226 to define or identify this non-null intersection. An embodiment of the two-dimensional bounding surface is of a geometrical shape calculated to be a best correlation or fit to the VOI 228.

The bounding surface or markers 226 are generally configured to reveal, define or demarcate the positions image elements of the VOI 228 or of the digital, three-dimensional reconstructed volume 212 that includes or envelopes the radiological sign of the suspect lesion for illustration to the user. An embodiment of the boundary surface or markers 226 may be three-dimensional, two-dimensional or one-dimensional. For each-dimensional type of boundary surface 226, a three-dimensional viewing algorithm is applied. Should the boundary surface 226 be two-dimensional or one-dimensional, the viewing of the volume 212 or the VOI 228 is implemented in continuously displaying the slices 214, 216, 218 of the digital volume 212 or the VOI 228 on the screen 160 or 165, giving the illusion of motion. Should the markers 226 be three-dimensional, the viewing of the reconstructed volume 212 or the VOI 228 is implemented by a three-dimensional viewing algorithm firstly enabling the display of the reconstructed volume 212 or the VOI 228 on the screen 160, as well as enabling the practitioner to view the volume 212 or the VOI 228 at different viewing angles. The use of the volumetric viewing algorithm draws the practitioner's attention to the VOI 228.

Another embodiment of step 225 includes communicating the acquired image data to a computer-aided detection system 230 of the controller 130, herein referred to as a CAD system 230. The CAD system 230 can be integrated with the controller 130 or be stand-alone and coupled in communication therewith. The CAD system 230 is operable to process the acquired medical image data that constitutes the series of acquired images or the generated digital, three-dimensional reconstructed volume 212, so as to calculate quantitative data (e.g., greyscale level, contrast, intensity, etc.) indicative of zones of radiological signs reflecting a presence of a suspect lesion.

The CAD system 230 can also generate the boundary surface or markers or graphical representations 226 to demarcate or define the zones or series of image elements that identify or envelope the suspect lesion. An embodiment of the CAD system 230 locates the markers 226 at the x and y coordinates of a location of the general center of the VOI 228. It can be represented for example by any graphic annotation defined beforehand or by a blinking feature or by color.

Figure 7:
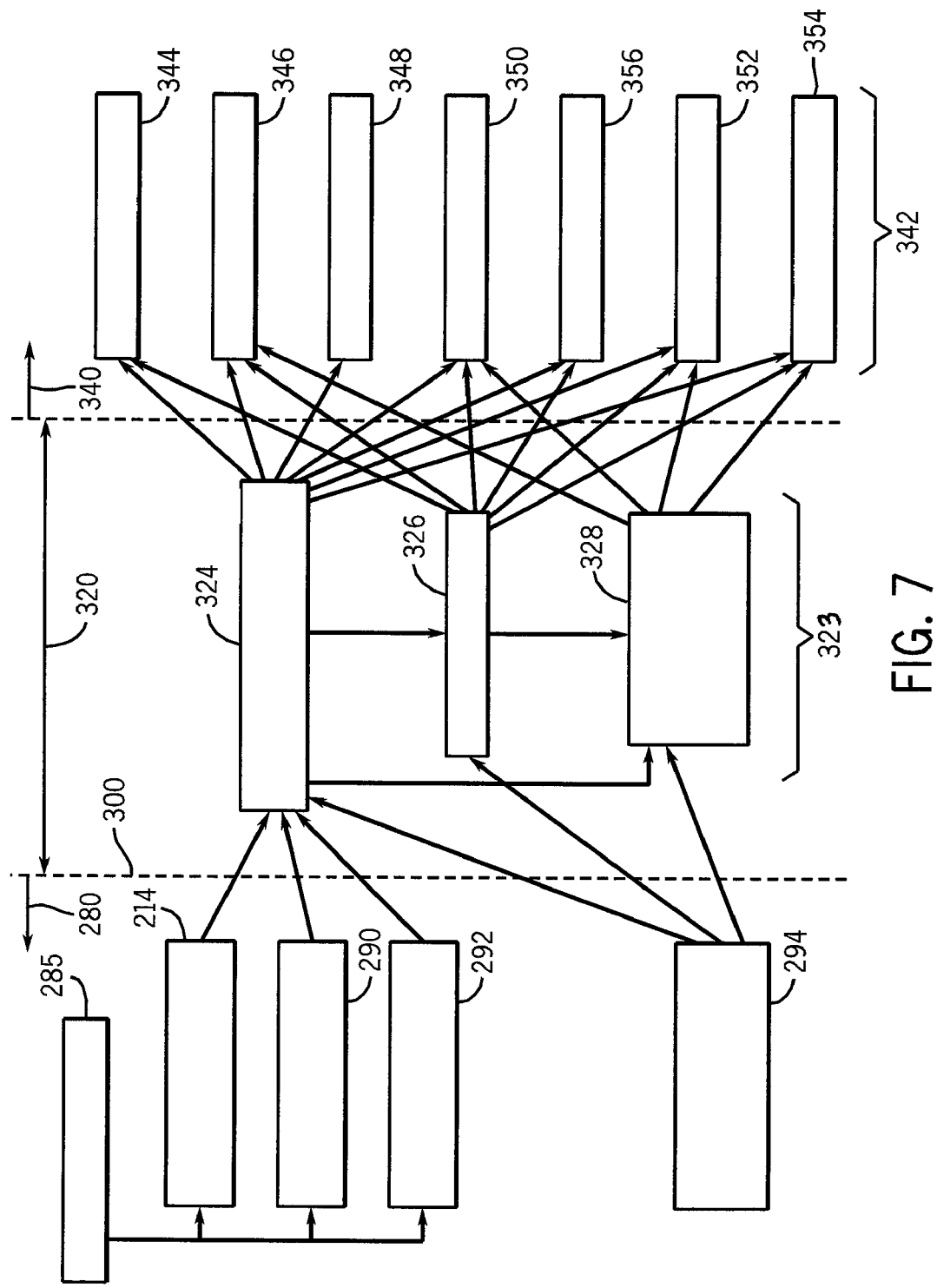
FIG. 7 illustrates a schematic diagram of an embodiment of generating a display of the volume of interest.

Referring to FIGS. 2 and 7, step 280 includes generating and illustrating a global overview image 285 of the digital, three-dimensional reconstructed volume 212 or a set of overview slabs. The global overview image 285 can be displayed in combination with the bounding surfaces 226 that define or identify the VOI 228 for illustration at the output device 150. The bounding surfaces 226 can be illustrated at the first viewport 160 with a constraint of transparency that prevents the bounding surfaces 226 from masking image data pertaining to radiology signs in the digital, three-dimensional reconstructed volume 212.

An embodiment of the global overview image 285 is one of the group including a projection image (P1 to Pn) as generated at the acquiring step 205, a set a overview slabs, a reprojection image 292 or a three-dimensional display of the three-dimensional, reconstructed volume 212 correlated to a selective virtual viewpoint per an instruction that includes a location received via the input device 145. The step 280 generally aids the user in more rapidly analyzing or filtering through the image data constituting the three-dimensional, reconstructed volume 212 and for the reprojection in comparing the volume 212 to prior 2D standard acquisitions.

Figure 3:
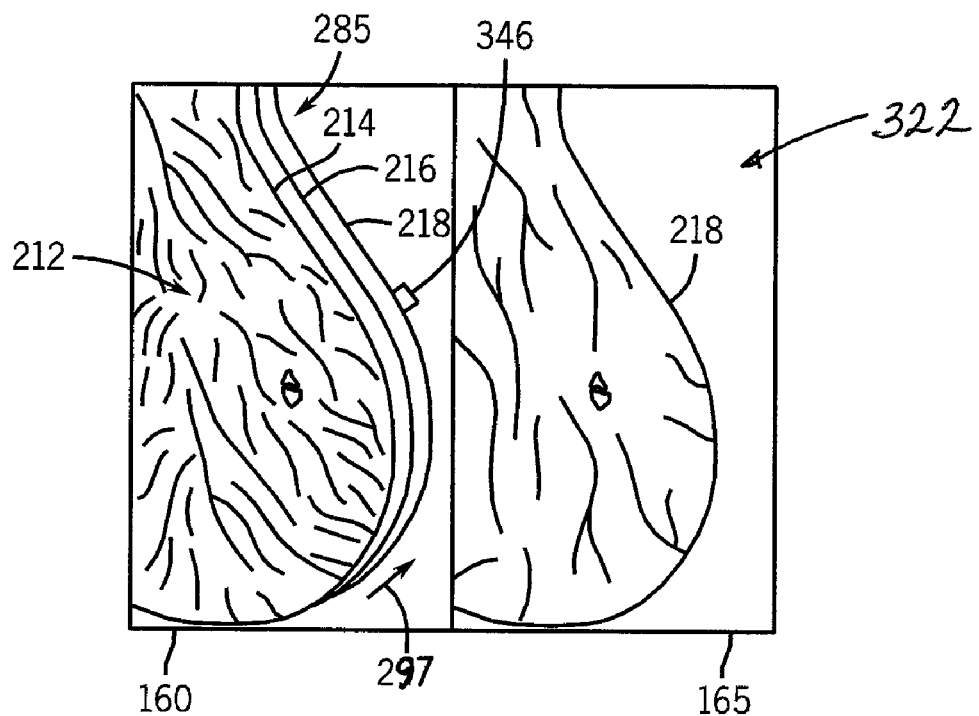
FIG. 3 shows a schematic diagram of an embodiment of the simultaneous global display comprised of a series of tomosynthesis slice frames and a localized display of a selected slice frame along a ray path including a maximum intensity pixel (MIP).
Figure 4:
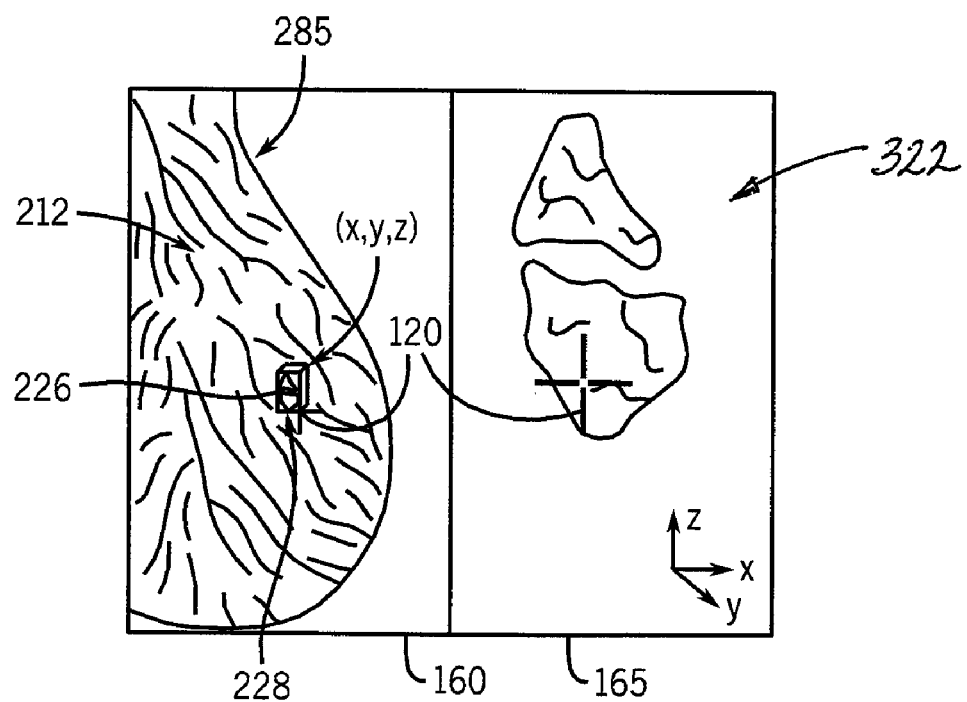
FIG. 4 illustrates a schematic diagram of an embodiment of the simultaneous global display and a localized display of a three-dimensional volume of interest in spatial relation to a tracked tool.
Figure 5:
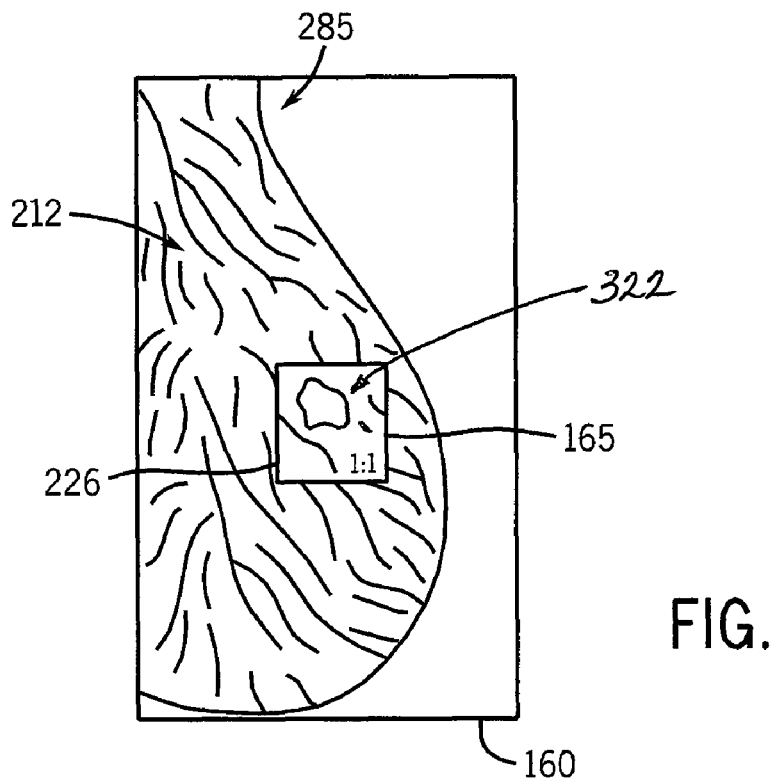
FIG. 5 shows a schematic diagram of an embodiment of the simultaneous global display and an additional view of a volume of interest portion at a one-to-one scale.
Figure 6:
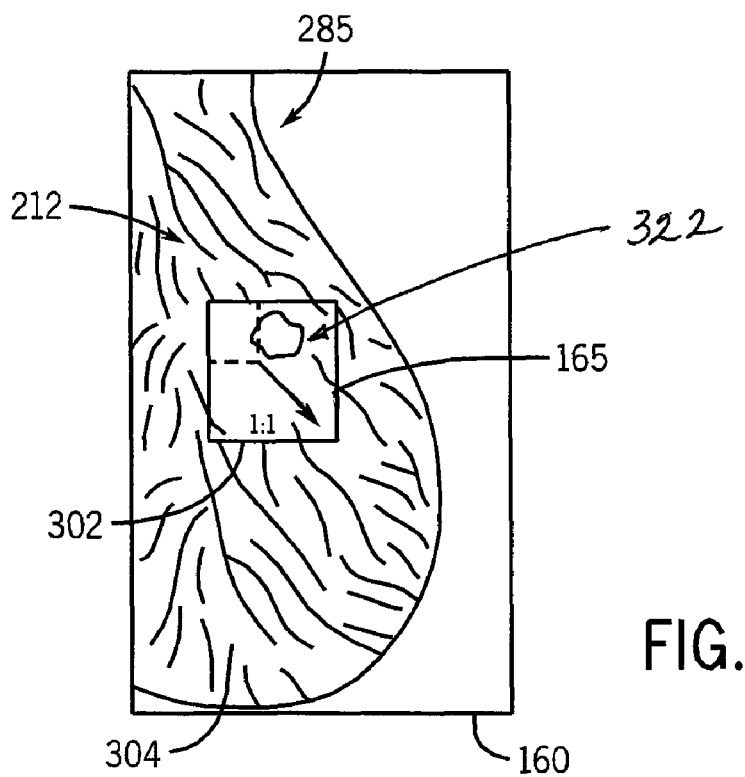
FIG. 6 illustrates a schematic diagram of an embodiment of the simultaneous global display and a localized display of identified with a zoom tool shown in the global display.

If the overview image 285 includes the reprojection image 292 or a three-dimensional display, step 280 can also include calculating the user's selected viewpoint of the digital, three-dimensional reconstructed volume 212 or the VOI 228. For sake of example, assume the selected viewpoint can be represented as a camera view of digital, three-dimensional reconstructed volume 212 defined by a virtual source or viewpoint 295 relative to a virtual detector 296 (See FIG. 3). The viewing algorithm is operable to calculate the two-dimensional rendering of the digital, three-dimensional reconstructed volume 212 from the viewpoint as input by the user via the input device 145 (e.g., movement or clicking of the mouse device 145 in spatial relation to the digital, three-dimensional reconstructed volume 212). Via the viewing algorithm, the system 20 is operable to generate the overview image 285 of the digital, three-dimensional reconstructed volume 212 from a virtual viewpoint at different angles and from different positions around the digital, three-dimensional reconstructed volume 212.

Alternatively to using the global overview image 285, the user can use a set of overview slabs that are obtained in combining elements of volume portions; wherein optionally the set of volume portions is sub-sampled with an overlap between two consecutive portions.

An embodiment of step 280 includes calculating the global overview image 285 or a set a overview slabs in considering an image element (e.g., pixel, voxel) with a maximum intensity pixel (MIP) value or minimum intensity pixel (MinIP) value that lies along a ray path (illustrated by arrow and reference 297 in FIG. 3 defined by the direction of the source 35 to the detector 40, or by the user-defined virtual source or viewpoint 295 and the virtual detector 296) directed from the virtual viewpoint or source 295 to each element of the virtual detector 296. MIP or MinIP can be replaced by any transformation that gives rise to a value from the voxel values along the considered ray paths. When using MIP (with respect to MinIP) rendering, a depth map can be created storing for each pixel of the overview image an information allowing to retrieve the slice containing the maximum (resp. minimum) grey intensity level along the ray path going from the virtual source to the pixel. In a particular embodiment, an automatic detection of radiological signs can be applied and the contrast of the detected signs can be enhanced in the reconstructed volume 212 to increase the probability of being visible in the global overview image or overview slabs.

Step 300 generally includes receiving instructions of navigation for navigating through the image elements that constitute the overview image 285 of the three-dimensional volume 212 and identifying a location of a portion of the volume 212. An embodiment of step 300 includes creating a slice-by-slice paging or cine-looped display mode of the succession of slices 214, 216, 218 of the three-dimensional reconstructed volume 212 and stop on a particular slice of interest constituting the portion itself or the central slice of the volume portion.

Another embodiment of step 300 includes creating a slab per slab paging or cine-looped display mode of the succession of overview slabs and stop on a particular slab of interest constituting the volume portion itself.

An embodiment of step 300 includes receiving instructions via the input device 145 in navigating through the image data of the overview image 285 of volume 212. The input device 145 can be employed to create an instruction that identifies or selects (e.g., via a mouse click) one or more pixels in the two-dimensional rendering of the above-described global overview image 285 (e.g., the reprojection 292 or the three dimensional display of the volume 212) or in one of the overview slabs. For example, the user can select the voxel that includes a contrast or grayscale level value that is of an increased likelihood to be the suspect lesion.

Having computed a location of at least one image element of the overview image 285 or of one overview slab having a parameter value (e.g., MIP) within a predetermined threshold of a radiological sign of a suspect lesion in the imaged subject 22, or having computed at least one bounding surface 226 having coordinates that defines the location of the outermost boundary of the at least one image element that constitutes the radiological sign of the suspect lesion, an embodiment of step 300 includes detecting or receiving an instruction that includes a selected location via input device 145 of at one of the image element that constitutes the volume 212 or the overview image 285, and in response displaying a volume portion.

For example, step 300 can include receiving an instruction indicative or identifying the bounding surface or marker 226 at the volume 212 or the overview image 285 to be enlarged and illustrated in the second display window 165. This embodiment of step 300 includes receiving an instruction (e.g., click of a mouse device) so as to identify the marker or boundary surface 226 of the VOI 228 to be enlarged and simultaneously illustrated in the second viewport 165 along with the digital, three-dimensional reconstructed volume 212 illustrated in the first viewport 160. Similar to the first embodiment, the contrast or intensity level of the illustration marker or bounding surface 226 can be set to a maximum level so as to further highlight or delineate relative to the image elements that constitute the volume 212 or the overview image 285.

According to another embodiment, step 300 includes receiving an instruction (e.g., click of a mouse device 145 at the bounding surface or marker 226) that identifies the VOI 228 and in response calculating and communicating one of a slice 214, 216 or 218 from the sequential succession of slices 214, 216, 218 most centrally located in spatial relation to the VOI 228 constituting thereof, or a subset of the succession of slices 214, 216, 218 that are located between an identified minimum and maximum coordinate value of the VOI 228, a slab representative of an average of the successive series of slices 214, 216, 218, a three dimensional display of the VOI 228.

Alternatively, step 300 can include receiving instructions via the input device 145 to switch or alternate from amongst a series of partial views or slices or set of slabs of interest that constitute the volume 212 or VOI 228.

Step 320 includes calculating and generating a partial view, two-dimensional display 322 of a volume portion 323 of clinical interest of the three-dimensional, reconstructed volume 212 correlated to the location of the at least one image element identified per the instruction received from the input device 145 in the navigating step 300. The volume portion 323 of clinical interest can be considered to comprise a fragment or component of interest that makes up the reconstructed volume 212, for example voxels illustrative of the candidate lesion. An embodiment of step 320 includes illustrating the two-dimensional display 322 in the second viewport or pane or window 165 in simultaneous illustration with one of the volume 212 or the VOI 228 or the overview image 285 as described above and shown in the first viewport 160, the first viewport 160 independent of the second viewport 165. An embodiment of the two-dimensional display 322 as illustrated in the second viewport 165 is at a scale (e.g., one to one) that is greater relative to the scale of the illustration of the volume 212 or the VOI 228 or the overview image 285 in the first viewport 160. The second viewport 165 may also be located (e.g., centrally located) at the selected image element of the volume 212 or the VOI 228 or the overview image 285 in the first viewport 160. Examples of the volume portion 323 include at least one slice of image data of interest 324 (e.g., a central slice), at least one or successive set of slabs 326 (using conic or parallel ray paths) representative of a combination of volume elements, or a three-dimensional image or model 328 of the volume portion 323.

For example, in response to receiving the instruction from the input device 145, step 320 can include automatically calculating or selecting the slice 218 from the succession of slices 214, 216, 218 along the ray path 292 of the selected image element (e.g., voxel, pixel, etc.) identified per an instruction (e.g., click of a mouse device) generated via the input device 145. For example, assume having computed the image element constituting the overview image 285 that includes the MIP in the direction of radiation or ray path 297 through the imaged subject 22 toward the detector 40, and for each pixel of the overview image, generating a depth map that includes the image element having the MIP and storing in the memory 140 of the controller 130. Upon receiving or detecting an instruction correlated to a click of the input device 145 over an image element of the overview image 285 per step 300, step 320 can include automatically illustrating the slice which index is stored in the depth map at the location of the image element of interest per the instruction communicated by the input device 145.

In yet another example, having detected or identified a location of the suspect lesion in the three-dimensional, reconstructed volume 212 or the overview image 285 as located with the CAD marker 226 such that upon receiving an instruction that includes the location of the marker 226 via the input device 145, step 320 includes creating the two-dimensional display 322 of the portion of interest of the three-dimensional, reconstructed volume 212 for illustration in the second viewport 165 simultaneously with the illustration of the three-dimensional, reconstructed volume 212 or the overview image 285 in the first viewport 160. The two-dimensional display 322 of the portion of interest can include one of a slice of image data, a slab generally representing a combination of successive series of slices, and a reprojection image 292 dependent on or correlated to a selective virtual viewpoint or ray path 297 per the instruction received via the input device 145 or a three dimensional display.

According to yet another example, having detected or tracked a location of the tool 105 through the imaged subject 22 via the tracking system 100, and registering the location of the tool 105 relative to the spatial relation of the three-dimensional, reconstructed volume 212 or the VOI 228 or the overview image 285 such that the controller 130 is operable to calculate the location of the one or more image elements that constitute the three-dimensional, reconstructed volume 212 or the VOI 228 or the overview image 285 correlating to the location of the tool 105, step 320 includes calculating and generating the two-dimensional display 322 of the portion of interest of the three-dimensional, reconstructed volume 212 or the VOI 228 or the overview image 285 that is correlated or dependent or centered at the location of the tool 105. An embodiment of the two-dimensional display 322 can be continuously or periodically updated with movement of the tool 105 relative to the imaged subject 22.

Step 340 includes generating a report 342 generating or creating additional views or information that represent the region of clinical interest within the three-dimensional dataset. This new information can be intended for instance to be viewed by a referring physician and may be part of the exam report. For some medical applications such as mammography, it can be critical to print or display the two-dimensional display 322 automatically at a one-to-one scale. One-to-one scale is of particular interest when comparing current image data with prior acquired image data, such as performed with high resolution imaging such as mammography or to assess the true size of a lesion. Embodiments of step 340 include creating a storing the two-dimensional display 322 of a portion of the three-dimensional, reconstructed volume 212 or the VOI 228 or the overview image 285 as a new DICOM image in the study stored in the memory 140. Another embodiment of step 340 includes generating a bookmark 346 that stores information to calculate or generate the volume portion. For example, the bookmark 346 may be represented by any graphical representation (e.g., coupled flag, color, etc.) that delineates the identified slice 218 from the remainder in the succession of slices 214, 216, 218 constituting the three-dimensional, reconstructed volume 212. Another embodiment of the step 340 includes generating and key image note 348 to the identified slice 218. An example of the key image note 348 is a DICOM normalized object represented as a graphic annotation or alphanumeric text (e.g., different thickness of border, a color, etc.) that highlights the partial view two-dimensional display 322 relative to the remainder of image data constituting the three-dimensional, reconstructed volume 212 or the VOI 228 or the overview image 285. Yet another embodiment of step 340 includes saving the partial view two-dimensional display 322 illustrated in the second window frame 165 in an exportable save state 350, as a graphic file 352 (e.g., as a pdf or html file format) for storage to the memory 140, or save to a known storage medium 354 (e.g., burn to a DVD, hard drive of a computer, etc.).

Yet another embodiment of step 340 includes automatically generating and printing the partial view, two-dimensional display 322 illustrated in the second viewport 165 as a printout 356 at a one-to-one scale relative to the imaged anatomical structure, where the output device 150 includes a printer (e.g., laser printer, ink-jet, etc.).

This written description uses examples to disclose the subject matter described herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method to illustrate image data of an imaged subject as acquired by a radiological imaging system, the steps comprising:
    acquiring a plurality of two-dimensional, radiography images of an imaged subject;
    generating a three-dimensional reconstructed volume from the plurality of two-dimensional, radiography images;
    navigating through the three-dimensional reconstructed volume, the navigating step including receiving an instruction from an input device that identifies a location of a volume portion of clinical interest within the three-dimensional reconstructed volume;
    calculating and generating an additional view of the volume portion of the three-dimensional reconstructed volume identified in the navigation step; and
    reporting the additional view or at least one parameter to calculate and generate the additional view,
    wherein the step of calculating and generating the additional view of the volume portion includes calculating a slab or a three-dimensional display of the volume portion dependent on one of a maximum value, a minimum value, an average value or any mathematical combination of intensity levels for a plurality of pixel or volume elements located along a direction parallel to a ray path extending from a virtual source to a virtual detector.

2. The method of claim 1, wherein the volume portion of the three-dimensional reconstructed volume comprises a slice or a set of successive slices.

3. The method of claim 1, the method further including the steps of
    calculating and generating a succession of overview slabs generated by combining a plurality of image elements that comprise the volume portion, wherein the plurality of image elements of the volume portion is sub-sampled with an overlap between consecutive volume portions.

4. The method of claim 1, the method further including the steps of:
    calculating and generating an overview image of the three-dimensional reconstructed volume; and illustrating the overview image in a first display screen, wherein the overview image includes a projection image generated at the acquiring step or a reprojection image of the three-dimensional reconstructed volume dependent on a direction parallel to ray path defined by a virtual source relative to a virtual detector.

5. The method of claim 4, wherein the step of calculating and generating the overview image includes:
   detecting at least one radiological sign in the three-dimensional reconstructed volume or volume portion;
   increasing a contrast of the at least one radiological sign in the three-dimensional reconstructed volume; and
   computing for each pixel of the overview image a maximum grey intensity level along the direction parallel to the ray path; and
   creating a depth map to store or retrieve a slice including the maximum grey intensity level along the direction parallel to the ray path.

6. The method of claim 4, wherein the navigating step includes:
   detecting a selection of a pixel of interest of the overview image via the input device, and
   assigning the slice obtained from the information stored in the depth map at the pixel of interest as the volume portion; and
   automatically illustrating the additional view of the volume portion either on the same or an alternative viewport or on a second display screen.

7. The method of claim 4, the method further including the steps of:
   automatically detecting a location of a lesion in the three-dimensional, reconstructed volume and creating a CAD marker that delimits a region of interest in the overview image dependent on the location of the lesion in the three-dimensional reconstructed volume,
   wherein the navigating step includes receiving an instruction correlated to a selection of the CAD marker via the input device on the overview image,
   assigning the region of interest including the lesion as the volume portion; and
   automatically illustrating the additional view of the volume portion either on the same or an alternative viewport or on a second display screen.

8. The method of claim 1, wherein the step of reporting includes printing the additional view of the volume portion of clinical interest at a one-to-one scale.

9. The method of claim 1, wherein the step of reporting includes generating and storing a new image in the study from the additional view or at least one parameter to calculate the additional view to a storage media.

10. The method of claim 1, wherein the step of reporting the additional view or information includes storing the two-dimensional display in a medical report.

11. The method of claim 1, wherein the step of reporting includes storing the at least one parameter to calculate the additional view in the database as a bookmark, an exportable save state, or key image note.

12. The method of claim 1, wherein the step of navigating includes going from one volume portion to another using the at least one parameter to calculate the additional view in the database.

13. A system to illustrate image data of an imaged subjected, comprising:
   an imaging system operable to acquire a plurality of two-dimensional, radiography images of the imaged subject;
   an input device;
   an output device; and
   a controller in communication with the imaging system, the input device, and the output device, the controller including a memory with a plurality of program instructions for execution by a processor, the plurality of program instructions representative of the steps comprising:
   generating a three-dimensional reconstructed volume from the plurality of two-dimensional, radiography images,
   navigating through the three-dimensional reconstructed volume, the navigating step including receiving an instruction from an input device that identifies a location of a volume portion of clinical interest within the three-dimensional reconstructed volume,
   calculating and generating an additional view of the volume portion of the three-dimensional reconstructed volume identified in the navigation step, and
   reporting the additional view or at least one parameter to calculate and generate the additional view,
   wherein calculating and generating the additional view includes calculating a slab or a three-dimensional display of the volume portion dependent on a maximum value, a minimum value, an average value or any mathematical combination of intensity levels for a plurality of pixel or volume elements located along a direction parallel to a ray path extending from a virtual source to a virtual detector.

14. The system of claim 13, wherein the volume portion of the three-dimensional reconstructed volume comprises one of a slice or a set of successive slices.

15. The system of claim 14, the program instructions further representative of the steps of:
   calculating and generating an overview image of the three-dimensional reconstructed volume; and
   illustrating the overview image in a first display screen, wherein the overview image includes a projection image generated at the acquiring step, a reprojection image, or a three-dimensional display of the three-dimensional reconstructed volume dependent on a direction parallel to ray path defined by a virtual source relative to a virtual detector.

16. The system of claim 15, wherein the step of calculating and generating the overview image includes:
   detecting at least one radiological sign in the three-dimensional reconstructed volume or volume portion;
   increasing a contrast of the at least one radiological sign in the three-dimensional reconstructed volume; and
   computing for each pixel of the overview image a maximum grey intensity level along the direction parallel to the ray path; and
   creating a depth map to store or retrieve a slice including the maximum grey intensity level along the direction parallel to the ray path.

17. The system of claim 16, wherein the step of navigating includes:
   detecting a selection of a pixel of interest of the overview image via the input device,
   assigning the slice obtained from the information stored in the depth map at the pixel of interest as the volume portion of clinical interest; and
   automatically illustrating the additional view of the volume portion either on the same or an alternative viewport or on a second display screen.

18. The system of claim 13, wherein the step of reporting includes printing the additional view of the volume portion of clinical interest at a one-to-one scale.

* * * * *